United States Patent [19]

Wild et al.

[11] Patent Number: 4,840,996
[45] Date of Patent: Jun. 20, 1989

[54] POLYMERIC COMPOSITION

[75] Inventors: Leslie Wild, Wyoming; Chun D. Lee, Cincinnati, both of Ohio

[73] Assignee: Quantum Chemical Corporation, New York, N.Y.

[21] Appl. No.: 126,435

[22] Filed: Nov. 30, 1987

[51] Int. Cl.$^4$ .................... C08L 23/26; C08L 23/04
[52] U.S. Cl. ................................ 525/193; 525/194; 525/240
[58] Field of Search .............................. 525/194, 193

[56] References Cited

U.S. PATENT DOCUMENTS 4,390,666  6/1983  Moriguchi et al. ................. 525/194
4,603,173  7/1986  Mack et al. ......................... 525/194

Primary Examiner—Carman J. Seccuro
Attorney, Agent, or Firm—Kenneth D. Tremain

[57] ABSTRACT

A composition comprising a first ethylene polymer having a density in the range of between about 0.940 and about 0.960; a second ethylene polymer having a melt index of at least about 20; and an organic peroxide is disclosed. An electrical conduit which includes an electrical conductor and an electrical conductor covering, the covering comprising the above-described composition of the present invention is also set forth. In addition, a process for producing the electrical conduit of the present invention is described. In this process an electrical conductor, i.e., a wire or a cable, is coated with a molten extrudate of the polymeric composition of the present invention.

8 Claims, No Drawings

POLYMERIC COMPOSITION

BACKGROUND OF THE DISCLOSURE

1. Field of the Invention

The present invention is directed to a polymeric composition useful as an electric conduit covering More particularly, the present invention is directed to a polymeric composition of a high density ethylene polymer, a high melt index ethylene polymer and an organic peroxide which is particularly useful as an electrical conducting covering.

2. Background of the Prior Art

The manufacture of insulated electrical conduits comprising an electrical conductor, i.e., wires and cable, covered by an insulating material is a major industrial product used throughout the world. Because of the importance of this manufactured commodity, all aspects of this product have continually been the subject of new developments. A particularly important area of this development has focused on the insulating covering of the electrical conduit.

Although all aspects of the electrical conduit covering art are subject to the new developments mentioned above, certain aspects of electrical conduit coverings still require further development to overcome the problems long appreciated by those skilled in the art. Two such areas involve processability of the polymeric composition used as the conduit covering and the shrinkback characteristics of the conduit covering itself.

The production of an electrical conduit involves coating a moving wire with a polymeric composition. This process usually involves extruding the polymeric composition as a melt onto the moving electrical conductor to be coated The difficulties associated with extruding the polymeric melt onto the electrical conductor are recognized in the art. Thus, the ease with which the polymeric composition can be extruded, that is, the processability of the polymeric composition, is an important indecia of the effectiveness of the coating process. Thus, the art recognizes the desirability and importance of improving the polymeric composition processability characteristic in electrical conduit manufacture.

The second, above-mentioned problem associated with covered electrical conduits, the so-called "shrinkback" phenomenon, originates in the electrical conduit forming operation. In order to produce electrical insulated conduits in an efficient matter the rate of covering of electrical wires, cables and the like must be rapid. This rate of covering produces stress in the polymeric composition coating which is manifested by stress release when the insulated electrical conduit is cut Upon slitting the electrical conduit, for use in various applications, the covering tends to "shrinkback." This results in uncoated electrical wire at the point of cutting. Those skilled in the art are aware of the safety hazards, inefficiencies and the like manifested by uncovered electrical conductors. Indeed, this problem is so well recognized in the art that electrical conduit manufacturers impose shrinkback standards. The length allowed for shrinkback of insulating coverings from slit electrical conduit is the subject of electrical conduit manufacturers' standards. Polymeric composition manufacturers producing products for this market oftentimes find it difficult formulating compositions which meet this shrinkback requirement without compromising other characteristics required of a polymeric cable covering.

In summary, the electrical conduit covering art, although producing a great variety of polymeric compositions which meet the needs of cable manufacturers, recognizes a continuing need to produce improved polymeric compositions, useful as electrical conduit coverings, which possess improved processability characteristics during electrical conductor covering operations and exhibit decreased shrinkback when utilized as a covering for electrical conduits.

BRIEF SUMMARY OF THE INVENTION

A new polymeric composition has now been developed which exhibits improved processability characteristics compared to the cable covering polymeric compositions of the prior art. In addition, this new polymeric composition, when coated over an electrical conductor, provides an electrical conduit covering having shrinkback characteristics well within industrial standards and far improved over the shrinkback characteristics of the electrical conduit coverings of the prior art.

In accordance with the present invention, a polymeric composition is provided. The polymeric composition comprises a first ethylene polymer having a density in the range of between about 0.940 and about 0.960; a second ethylene polymer having a melt index of at least about 20; and an organic peroxide.

In further accordance with the subject invention an electrical conduit is provided. The conduit comprises an electrical conductor and an electrical conductor covering, the covering comprising the above defined polymeric composition.

In still further accordance with the instant invention a process for covering an electrical conductor is provided. In this process a melt of the above-defined polymeric composition is coated onto an electrical conductor.

DETAILED DESCRIPTION

The polymeric composition of the present invention comprises a first ethylene high density polymer, a second high melt index ethylene polymer and an organic peroxide compound. The composition of the present invention finds particular application as an electrical conduit covering for an electrical conductor having improved processability and reduced shrinkback characteristics while retaining other physical and mechanical properties necessary in this application.

Although the scope of the composition of the present invention is independent of any theory explaining its superior properties, it is theorized that the incorporation of a low molecular weight component, the high melt index ethylene polymer, and the simultaneous molecular weight buildup caused by organic peroxide decomposition provides an effective means of broadening the molecular weight distribution of the basic high density ethylene polymer. The composition of this invention is thus superior to a mere blending of a high and a low molecular weight component as sometimes practiced in the prior art. The composition of the present invention is theorized to allow much better mixing of the components without shear degradation of the high molecular weight species. These effects produce a composition having improved processability and decreased shrinkback properties.

As stated above, the first ethylene polymer is a high density ethylenic polymer. Thus, the density of the first ethylene polymer is in the range of between about 0.94 and about 0.96. It is noted that density units have been omitted. However, those skilled in the art are aware that the units, grams per cubic centimeter, are inferred whenever a density is recited. More preferably, the density of the first ethylene polymeric component is in the range of between about 0.942 and about 0.956. Even more preferably, the density of the first ethylene polymeric component is between about 0.945 nd about 0.950. Still more preferably, the density of the first ethylene polymeric component is about 0.946 to about 0.949. Most preferably, the density of the first ethylene polymeric component is about 0.948.

The first ethylene polymeric component of the composition of the present invention is characterized by a melt index in the range of between about 0.05 and about 1.0 as determined by ASTM Method D-1238, Condition E. More preferably, the melt index of the first ethylene polymeric component is in the range of between about 0.1 and about 0.8. Still more preferably, the melt index of the first polymeric component is between about 0.15 and about 0.6. Even more preferably, the melt index, as measured by ASTM Method D-1238, Condition E, is in the range of between about 0.2 and 0.5. Most preferably, the first ethylene polymeric component possesses a melt index of about 0.3.

The first ethylene polymer is an ethylenic polymer selected from the group consisting of an ethylene homopolymer and a copolymer of ethylene and an alpha-olefin monomer having at least three carbon atoms. More preferably, the first ethylenic polymer is selected from the group consisting of an ethylenic homopolymer and a copolymer of ethylene and a $C_3$ to $C_8$ alpha-olefin. Still more preferably, the first ethylenic polymer is selected from the group consisting of an ethylene homopolymer and a copolymer of ethylene and a $C_3$-$C_8$ alpha-olefin wherein the alpha-olefin is present in a molar concentration of between about 0.1 mole percent to about 4 mole percent, based on the total constituency of the ethylene copolymer. Even more preferably, the first ethylene polymeric component is selected from the group consisting of an ethylene homopolymer and a copolymer of ethylene and a $C_3$-$C_8$ alpha-olefin wherein the alpha-olefin comprises about 0.2 mole percent to about 2 mole percent of the ethylenic copolymer. Yet more preferably, the first ethylene polymeric component is selected from the group consisting of an ethylene homopolymer and a copolymer of ethylene and butene wherein the butene comprises about 0.3 mole percent to about 0.8 mole percent of the ethylene-butene copolymer. Most preferably, the first ethylene polymeric component is selected from the group consisting of an ethylene- homopolymer and a copolymer of ethylene and butene wherein the butene comprises between about 0.4 mole percent and about 0.5 mole percent of the ethylene-butene copolymer.

The second component of the composition of the present invention is a low molecular weight constituent That is, the second ethylene polymeric component is characterized by a melt index of at least about 20, as measured by the method set forth in ASTM D-1238, Condition E. More preferably, the melt index of the second ethylene polymeric component is in the range of between about 20 and about 2,000. Still more preferably, the melt index of the second ethylene polymeric component is between about 30 and about 500. Even more preferably, the melt index of the second ethylene polymeric component is between about 40 and about 200. Most preferably, the melt index of the second ethylene polymeric component is in the range of between about 50 and about 175. The density of the second ethylene polymeric component is not critical. That is, the second ethylene polymer may be a low density, intermediate density or high density ethylene polymer.

The second low molecular weight, high melt index ethylene polymeric component is selected from the group consisting of an ethylene homopolymer and a copolymer of ethylene and an unsaturated hydrocarbon monomer More preferably, the second ethylene polymeric component is selected from the group consisting of an ethylene homopolymer and a copolymer of ethylene and an alpha-olefin having at least three carbon atoms. Still more preferably, the second ethylene polymeric component is selected from the group consisting of an ethylene homopolymer and a copolymer of ethylene and a $C_3$-$C_8$ alpha-olefin. Even more preferably, the second ethylene polymeric component is selected from the group consisting of an ethylene homopolymer and a copolymer of ethylene and a $C_3$-$C_8$ alpha-olefin which comprises about 0.1 mole percent to about 4 mole percent of the copolymer. Even still more preferably, the second polymeric component is selected from the group consisting of an ethylene homopolymer and a copolymer of ethylene and a $C_3$-$C_8$ alpha-olefin which comprises between about 0.2 mole percent and about 2 mole percent based on the total constituency of the copolymer Yet even still more preferably, the second ethylene polymeric component is selected from the group consisting of ethylene homopolymer and a copolymer of ethylene and butene wherein the butene comprises between about 0.3 mole percent and about 0.8 mole percent. Most preferably, the second polymer ethylenic polymeric constituent is selected from the group consisting of ethylene homopolymer and a copolymer of ethylene and butene wherein the butene comprises between about 0.4 molar percent and 0.5 mole percent, based on the total copolymer constituency.

Since only the molecular weight, as indicated by melt index, is critical, the second ethylene polymer may be produced by any ethylene polymerization process. Thus, this polymeric component can be produced by a high pressure, free radical initiated process or by a lower pressure, coordination catalyst initiated process.

The third essential component of the composition of the present invention is an organic peroxide Any of the organic peroxides usually employed to effect gelation or crosslinkage of ethylenic polymers may be employed in the composition of the present invention. Preferably, the organic peroxide utilized with the composition of the present invention is selected from the group consisting of an acetylenic diperoxide, dicumyl peroxide, a bis(tert-alkyl peroxyalkyl)benzene, an alkyl hydroperoxide and a dialkyl peroxide. More preferably, the organic peroxide component of the composition of the present invention is selected from the group consisting of 2,5-dimethyl-2,5-di(t-butyl peroxy)hexyne-3, dicumyl peroxide, dimethyl-2,5-di(t-butyl peroxyisopropyl)benzene, t-butyl hydroperoxide and di-t-butyl peroxide. Still more preferably, the organic peroxide utilized in the composition of the present invention is selected from the group consisting of 2,5-dimethyl-2,5-di(t-butylperoxy) hexyne-3 and dicumyl peroxide. Most preferably, the organic peroxide utilized in the composition of the present invention is 2,5-dimethyl-2,5-di(t-butylperoxy)hexyne-3.

In a preferred embodiment the first component, the first ethylene polymer of the composition comprises between about 50% and about 99% by weight. More preferably, the first ethylene polymeric component comprises between about 70% and about 98% by weight of the composition. Still more preferably, the first ethylene polymeric component is present in a concentration of between about 80% and about 97% by weight. Even more preferably, the first ethylene polymeric component of the composition is representative of between about 90% and about 96% by weight of the composition. Most preferably, the first, high density ethylene polymer component comprises approximately 95% by weight of the composition. All of these recitations of weight percentages are based on the total weight of the composition.

The second component, the high melt index ethylene polymeric constituent, comprises between about 1% by weight and about 50% by weight of the composition. More preferably, the second polymeric component is representative of between about 2% by weight and about 30% by weight. Still more preferably, the second ethylene polymeric component is present in the composition in a concentration of between about 3% and about 20% by weight. Even more preferably, the second ethylene polymeric component comprises between about 4% and about 10% by weight of the total composition. Most preferably, the second component is present in a concentration of about 5% by weight. All of the recited weight concentrations are again based on the total weight of the composition.

The third component, the organic peroxide, is present in a free radical generating effective amount. Preferably, the organic peroxide represents a concentration of between about 100 parts by weight per million parts by weight of the total composition (ppm) and about 700 ppm. More preferably, the organic peroxide is present in a concentration in the range of between about 125 ppm and about 400 ppm. Still more preferably, the organic peroxide is representative of between about 150 ppm and about 200 ppm. All of the above peroxide concentration levels are again based on the total weight of the composition.

It is important to emphasize that the manner of addition of the three essential components of the composition of the present invention is not critical. That is, the three components may be blended in any order. For example, the first ethylene polymer, the second ethylene polymer and the organic peroxide may be separately added to form the mixture constituting the composition. Alternatively, the peroxide may be preblended with the first or the second ethylene polymeric component. In yet another method of addition, the two ethylene polymers may be premixed and then blended with the organic peroxide. Other methods, not mentioned above, are within the contemplation of the instant invention.

Additional components may optionally be present in the polymeric compositions. Of these additional components, it is oftentimes preferable to include a co-curing agent, in addition to an organic peroxide. Of the co-curing agents preferred for use in the composition of this invention, triallyl cyanurate, triallyl isocyanurate and 1,2-polybutadiene are particularly preferred. The concentration of the co-curing agent is that required to provide a co-curing effective amount of the co-curant.

An additional additive, usually added to the polymeric composition, is at least one antioxidant which is typically representative of between about 0.1% by weight to about 3% by weight, based on the total weight of the composition.

Another additive normally added to the composition is a colorant, dye or the like. One important additive within this class of additives is carbon black which, in addition to imparting black color, protects against the detrimental affects of ultra-violet rays.

Other additives that may or may not be included in the composition of this invention include fillers, such as clays and calcium carbonate, and lubricants.

The present invention is also directed to an electrical conduit comprising an electrical conductor such as a wire, a cable or the like, which is constructed of an electrically conducting metal, and the coating composition described above. That is, the electrical conduit of the present invention comprises an electrical conductor covered with a polymeric composition which comprises the composition described in detail above. The electrical conduit may be a communication cable, a telephone wire or the like.

In still another aspect of the present invention, a process for coating an electrical conductor is provided. The process of the instant invention involves coating an electrical conductor, which again can be a communication cable, a telephone wire or the like, by extruding a melt of the polymeric composition of the present invention onto an electrical conductor. In a preferred embodiment of the process of this invention, the electrical conductor, usually a metal wire having excellent electrical properties, i.e., copper or silver wire, is coated while the wire is continuously advanced More preferably, the electrical conductor is coated while moving at a speed of at least about 500 feet per minute More preferably, the electrical conductor moves at a speed of at least about 750 feet per minute while being coated with molten polymeric composition extrudate. Again, the molten extrudate coating is the composition of the subject invention defined in detail hereinabove.

The following examples are given to illustrate the scope of the present invention. Since, the examples are given for illustrative purposes only, the invention should not be limited thereto.

EXAMPLE 1

Preparation of a Polymer Composition

A composition was formed by blending 95% by weight, based on the total weight of the composition, of a high density polyethylene, an ethylene homopolymer, having a melt index, as determined by ASTM Method D-1238, Condition E, of 0.4 and a density of 0.947; 5% by weight, based on the total weight of the composition, of a second ethylene polymer, a high melt index polyethylene, an ethylenic homopolymer, characterized by a melt index, as determined by the method of ASTM D-1238, Condition E, of 60 and a density of 0.92; and 165 ppm of 2,5-dimethyl-2,5-di(t-butylperoxy)hexyne-3.

The three components were blended by adding pellets of the first high density polyethylene into a Brabender [trademark] single screw, 1.9 cm diameter extruder To the extruder was also added pellets of the second, high melt index ethylene polymer which had previously been physically blended with 2,5-dimethyl-2,5-di(t-butylperoxy)hexyne-3 These ingredients were melt blended and extruded from the same Brabender [trademark] apparatus operated at a temperature of between 200° C. and 210° C. over a residence time of between 40 and 90 seconds. Samples of the molten composition were tested to determine composition melt index and density. (It is noted that the melt index and density of the first and second ethylene polymeric components were supplied by the polymer manufacturer ) The extrudate composition exiting the Brabender [trademark] extruder was pelletized.

A summary of the composition of this example is provided in Table 1.

EXAMPLE 2

Preparation of a Polymeric Composition

Example 1 was repeated except that concentration of the organic peroxide, 2,5-dimethyl-2,5-di(t-butylperoxy)hexyne-3, was increased to 310 ppm, based on the total weight of the composition. That is, Example 1 was duplicated but for the blending of 310 ppm of the organic peroxide with pellets of the high melt index polyethylene (ethylene homopolymer) rather than the 165 ppm of the same organic peroxide utilized in Example 1.

The resultant composition, as measured by its melt index and density, is tabulated in Table 1.

EXAMPLES 3 AND 4

Preparation of Polymeric Compositions

The high density polyethylene, defined in Example 1, representing 95% by weight of the composition, was blended with a high melt index ethylene homopolymer characterized by a melt index of 50. In addition to this minor difference in melt index, compared to the second ethylene polymer of the compositions of Examples 1 and 2, this second ethylene, high melt index ethylene polymer was distinguished from that of Examples 1 and 2 in that it was a high density ethylene homopolymer, having a density of 0.960. In Example 3 this high density polyethylene was blended with 240 ppm of 2,5-dimethyl-2,5-di(t-butylperoxy)hexyne-3. In Example 4, the constituency of this peroxide was increased to 320 ppm.

The two compositions were blended in accordance with the procedure of Example 1. Samples of the compositions were tested to determine their melt index and density. The composition of Example 3 was characterized by a melt index of 0.25 and a density of 0.947. The composition of Example 4 differed slightly in that its melt index was reduced to 0.10. However, the density of the composition was the same as that of Example 3, 0.947 g/cc.

The compositions of these examples are tabulated in Table 1.

EXAMPLE 5

Preparation of a Polymeric Composition

Example 1 was repeated to the extent that the high density polyethylene component which comprised 95% by weight of the composition of Example 1 was again utilized with a different second, high melt index ethylene polymer. The second ethylene polymer, in this example, was an even lower molecular weight polymer than either of the second, high melt index ethylene polymeric constituents of Examples 1 to 4. The second ethylene polymer of this example was characterized by a melt index of 150 and a density of 0.913. Again, this second ethylene polymer was pre-blended with 2,5-dimethyl-2,5-di(t-butylperoxy)hexyne-3, in this example, in a concentration of 175 ppm.

The composition of this example, formed in accordance with the procedure set forth in Example 1, is reported in tabular form in Table 1.

EXAMPLE 6

Preparation of a Polymeric Composition

The procedure of Example 1 was repeated However, the high density polyethylene of Example 1 was replaced with another ethylene homopolymer, having a melt index of 0.35 and a density of 0.950. This polymer was blended with the second ethylene high melt index homopolymer of Example 1, the low density polyethylene characterized by a melt index of 60 and a density of 0.920. The second low density, high melt index polyethylene constituent, as in Example 1, was pre-blended with 2,5-dimethyl-2,5-di(t-butylperoxy)hexyne-3. In this example, the peroxide constituted 325 ppm, based on the total weight of the composition.

The constituents were blended in accordance with the procedure of Example 1. The resultant characteristics of the composition of this example are reported in Table 1.

EXAMPLE 7

Preparation of a Polymeric Composition

Ninety-five percent by weight of the high density resin of Example 6 was blended with 5 percent by weight of the high density, high melt index resin of Examples 3 and 4, the polyethylene having a melt index of 50 and a density of 0.960. Again, the second, high melt index ethylene polymer had been previously pre-blended with 2,5-dimethyl-2,5-di(t-butyl-peroxy)hexyne-3, in this example, with 155 ppm of the peroxide.

A polymeric composition, characterized by a melt index of 0.17 and a density of 0.950, was formed in accordance with the procedure set forth in Example 1. The composition of this example is included in the overall summary provided in Table 1.

COMPARATIVE EXAMPLES 1-3

Preparation of Comparative Polymeric Compositions

A comparative composition, the composition of Comparative Example 1, was prepared by utilizing the high density polyethylene component of Example 1, the ethylene homopolymer characterized by a melt index of 0.40 and a density of 0.947.

The composition of Comparative Example 2 was the first ethylene polymer, the high density, low melt index ethylene homopolymer, of Examples 6 and 7. This high density polymer is characterized by a melt index of 0.35 and a density of 0.950.

The composition of Comparative Example 3 was a blend of 95% by weight of the high density polyethylene of Example 1 and 5% weight of the high melt index ethylene polymer of Example 1. That is, the composition of Comparative Example 3, characterized in the melt index of 0.45 and a density of 0.947, was identical to the composition of Example 1 but for the omission of the peroxide constituent.

The compositions of Comparative Examples 1 to 3 are tabulated in Table 1.

EXAMPLE 8

Determination of the Processability of the Polymeric Compositions age the lesser the shrinkback characteristic of the polymeric composition and the more useful is the polymeric composition as an electrical conduit covering.

The results of this test are included in Table I.

TABLE I

| First Polymer | %, First Polymer | Second Polymer | %, 2nd Polymer | Conc.[a] Peroxide | Composition MI | Density | Visc.[b] Ratio | Percent Shrink. |
|---|---|---|---|---|---|---|---|---|
| HDPE 1[c] | 95 | LDPE 1[d] | 5 | 165 | 0.31 | 0.947 | 147 | 80.5 |
| HDPE 1 | 95 | LDPE 1 | 5 | 310 | 0.12 | 0.947 | 182 | 80.0 |
| HDPE 1 | 95 | HDPE 3[e] | 5 | 240 | 0.25 | 0.947 | 158 | — |
| HDPE 1 | 95 | HDPE 3 | 5 | 320 | 0.10 | 0.947 | 212 | — |
| HDPE 1 | 95 | LDPE 2[f] | 5 | 175 | 0.20 | 0.947 | 154 | 78.0 |
| HDPE 2[g] | 95 | LDPE 1 | 5 | 325 | 0.09 | 0.950 | 229 | — |
| HDPE 2 | 95 | HDPE 3 | 5 | 155 | 0.27 | 0.950 | 183 | — |
| HDPE 1 | 100 | — | 0 | 0 | 0.40 | 0.947 | 86 | 82.7 |
| HDPE 2 | 100 | — | 0 | 0 | 0.35 | 0.950 | 109 | — |
| HDPE 1 | 95 | LDPE 1 | 5 | 0 | 0.45 | 0.947 | 93 | — | tnotes
Parts per million of 2,5-dimethyl-2,5-di(t-butylperoxy)hexyne-3
Processability ratio of dynamic viscosity at 0.01 sec$^{-1}$ to dynamic viscosity at 250 sec$^{-1}$
Polyethylene having a MI of 0.4 and a density of 0.947 g/cc.
Polyethylene having a MI of 60 and a density of 0.920 g/cc.
Polyethylene having a MI of 50 and a density of 0.960 g/cc.
Polyethylene having a MI of 150 and a density of 0.913 g/cc.
Polyethylene having a MI of 0.35 and a density of 0.950 g/cc.

The compositions of Examples 1-7 and Comparative Examples 1-3 were each tested to determine their processability. To quantify this characteristic, each of the polymers was tested to determine its dynamic viscosity at two different frequencies, 0.01 sec$^{-1}$ and 250 sec$^{-1}$. The ratio of the dynamic viscosity at 0.01 sec$^{-1}$ to the dynamic viscosity at 250 sec$^{-1}$ yields a measure of the shear dependence of the melt flow. Those skilled in the art aware that this measure of shear dependence is a measure also of the processability of the polymer. The higher the value of this ratio, the more processable is the polymer composition.

To determine the dynamic viscosity at the two tested frequencies, pellets of each polymeric composition formed in Examples 1-7 and Comparative Examples 1-3 were melted and their dynamic viscosity at the two frequencies were measured at 190° C. in a Rheometrics [trademark] mechanical spectometer.

The results of this test are summarized in Table I.

EXAMPLE 9

Determination of Shrinkback of the Polymeric Compositions

The polymer compositions of Examples 1, 2, 5 and Comparative Example 1, which each included as the first ethylene polymer the high density polyethylene having a melt index of 0.4 and a density of 0.947, were tested to simulate their shrinkback property.

In this simulated test, pellets of each of the compositions were remelted at 230° C. in a Brabender [trademark] single screw extruder having a diameter of 1.9 cm. The molten compositions were each extruded therefrom into drawn rods. The rods were carefully measured and cut into 10 cm. lengths. Each of the rods were then disposed in an oil bath maintained at 130° C. for 30 minutes. Thereafter, the lengths of each of the rods were again measured The percent shrinkage was calculated as the difference between the original length of the rod and the shrunken length after 30 minutes exposure to 130° C. divided by the original length of the rod. That is, the percent shrinkage was defined by the equation, % shrinkage=$[(L_o-L_s)/L_o]100$, where $L_o$ is the original length of the drawn specimen and $L_s$ is the length of the drawn specimens after 30 minutes exposure to 130° C. Obviously, the lesser the percent shrink-

EXAMPLE 10 AND COMPARATIVE EXAMPLE 4

Comparison of Polymeric Compositions

The composition of Example 2, a blend of 95% HDPE having a melt index of 0.4 and a density of 0.947; 5% LDPE characterized by a melt index of 60 and a density of 0.920; and 310 ppm of 2,5-dimethyl-2,5-di(t-butylperoxy)hexyne-3 was extruded through a single screw extruder having a diameter of 6.4 cm at a temperature of 220° C. over a residence time of 30 seconds. This polymeric composition was pelletized and then subjected to a high shear strand extrusion test at 230° C. using the same extruder The extruder was run at a rate equivalent to a wire coating rate of 1,000 feet per minute using a 1/16 inch diameter die.

The same extrusion test was conducted using the composition of Comparative Example 1 which comprises the high density polyethylene component of the composition of Example 2. That is, the high density polyethylene having a melt index of 0.4 and a density of 0.947 without the inclusion of a second ethylene polymer and an organic peroxide.

The results of this test, comparing the polymeric composition of Example 2 with the single polymeric component composition of Comparative Example 2 are tabulated in Table 2. The data of Table 2 includes the back pressure and the power required to process the extrudate. Those skilled in the art are aware that the higher the back pressure and power requirement, the more difficult is the processability of the polymeric composition.

The shrinkback property, as defined in Example 9, was measured for the two compositions. Significantly, reduced shrinkback was noticed in the composition of Example 2 compared to that of Comparative Example 1. In addition to the above tests, the appearance of the extruded strands was noted.

A total summary of this example, utilizing the compositions of Example 10 and Comparative Example 4, is provided in Table 2.

TABLE 2

|  | Example 10 | Comparative Example 4 |
|---|---|---|
| Melt Index* | 0.12 | 0.40 |
| Density (g/cc) | 0.947 | 0.947 |
| Line Speed (ft/min) | 1,000 | 1,000 |
| Melt Temp. (°C.) | 230 | 230 |
| Back Pressure (psi) | 4,100 | 4,700 |
| Power (watts) | 9,520 | 10,465 |
| Strand Appearance | Smooth | Melt Fracture |
| % Shrinkage | 82.5 | 88 |

*As determined by ASTM D-1238, Condition E.

EXAMPLE 11

Commercial High Speed Wire Coating Test

A commercial cable coating operation was conducted utilizing the polymeric composition of Example 1 with the minor change that the 2,5-dimethyl-2,5-di(t-butylperoxy) hexyne-3 constituent concentration was reduced to 150 ppm. That is, the composition comprised 95% by weight of the first ethylene polymeric component of Example 1; 5% by weight of the second ethylene polymeric component of Example 1 and 150 ppm of the organic peroxide, 2,5-dimethyl-2,5-di(t-butylperoxy)hexyne-3, pre-blended with the second polyethylene component.

The two components were powdered and co-fed into a finishing extruder at a temperature of 225° C. The resultant product, the blend of the two polymeric components and the peroxide, was determined to possess a melt index of 0.30 and a density of 0.947. The polymer was extruded on two commercial high speed cable coating lines. In this test wire was continuously coated at the high speed rate and coated with the above described polymeric composition.

A 5-foot length of insulated electrical conductor, formed in this test, was cut and then six specimens of 8-inch coated wire were cut from the center of this 5-foot coated conductor. Each of the six 8-inch samples were carefully trimmed and measured to six inches by cutting both ends of each sample. The thus formed six 6-inch samples were each placed on a suitable bed in a convection oven maintained at a temperature of 115° C. for 24 hours. Upon removal from the oven the length of the polymeric covering of each of the 6-inch samples was measured. It is again emphasized that the original polymeric covering of each of the samples was carefully measured to be 6 inches prior to heating.

The above described industrial test requires that the shrinkback of the polymeric, insulating covering not exceed 16/64 inch, that is, one quarter inch. The above described test, utilizing the composition described hereinabove, in two trials produced shrinkbacks of 13/64 inch and 9/64 inch, well within industry specifications.

The above-described polymeric composition was also tested to determine its processability. Again this characteristic was reported as the ratio of dynamic viscosity of the polymeric composition at 0.01 sec$^{-1}$ to the dynamic viscosity at 250 sec$^{-1}$. This ratio was determined to be 139.

COMPARATIVE EXAMPLE 5

Commercial High Speed Wire Coating Test

Example 11 was repeated except that the polymeric composition of that example was replaced with the composition of Comparative Example 1, the first ethylene polymer component of the composition of Example 11 having a melt index of 0.4 and a density of 0.947.

Again, the product of the conduit coated with the composition of Comparative Example 1 was tested. To this end, a 5-foot length of the insulated conductor was cut from the conduit formed in this example. Six 8-inch samples were, in turn, cut from the center of this 5-foot length of coated wire. Again, the six samples were each reduced to 6 inch lengths by trimming each end. The carefully measured samples were placed in a suitable bed in a convection oven, maintained at 115° C., for 24 hours. Upon removal from the oven, the length of each insulated covering was carefully measured. As in Example 11, two trials were conducted. The first trial yielded a shrinkback of 20/64 inch. The second trial resulted in a 21/64 inch shrinkback. Both samples thus failed the industry specification requiring that shrinkback not exceed 16/64 inch.

The comparison polymer, representative of the prior art, was also tested to determine the polymer's processability. Again, dynamic viscosity at the two frequencies discussed above were measured. The ratio of dynamic viscosity at 0.01 sec$^{-1}$ to the dynamic viscosity at 250 sec$^{-1}$ was determined, in accordance with the procedure of Example 1, to be 86. This processability index is far below the ratio obtained for the composition of Example 11, within the scope of the present invention, a ratio of 139.

In addition to this manifestation of improved processability utilizing the composition of the present invention, it was also noted that the screw speed of the extruder extruding the composition within the scope of the present invention was significantly lower than the speed required to coat the unmodified polymer of this comparative example.

The above embodiments and examples are given to illustrate the scope and spirit of the instant invention. These embodiments and examples will make apparent, to those skilled in the art, other embodiments and examples These other embodiments and examples are within the contemplation of the present invention. Therefore, the instant invention should be limited only by the appended claims.

What is claimed is:

1. A composition comprising:
    a first ethylene polymer having a density in the range of between about 0.94 and about 0.96 and a melt index in the range of between about 0.05 and about 1.0, said first ethylene polymer present in a concentration of between about 90% and about 97% by weight, based on the total weight of said composition;
    a second ethylene polymer having a melt index of at least about 20, said second ethylene polymer present in a concentration of between about 3% and about 10% by weight, based on the total weight of said composition; and
    an organic peroxide present in a free radical generating effective amount.

2. A composition in accordance with claim 1 wherein said organic peroxide is present in a concentration in the range of between about 100 ppm and about 700 ppm.

3. A composition in accordance with claim 2 wherein said organic peroxide is present in a concentration in the range of between about 125 ppm and about 400 ppm.

4. A composition in accordance with claim 3 wherein said first ethylene polymer is present in a concentration of between about 90% and about 96% by weight; said second ethylene polymer is present in a concentration of between about 4% and about 10% by weight; and said organic peroxide is present in a concentration in the range of between about 150 ppm and about 200 ppm.

5. A composition in accordance with claim 4 including a co-curing agent selected from the group consisting of triallyl cyanurate, triallyl isocyanurate and 1,2-polybutadiene.

6. A composition in accordance with claim 1 wherein said first ethylene polymer is selected from the group consisting of an ethylene homopolymer and a copolymer of ethylene and an alpha-olefin having at least three carbon atoms; said second ethylene polymer is characterized by a melt index of between about 20 and about 2,000 and is selected from the group consisting of an ethylene homopolymer and copolymer of ethylene and an unsaturated hydrocarbon monomer; and said organic peroxide is selected from the group consisting of acetylenic diperoxide, dicumyl peroxide, a bis(tert-alkyl peroxyalkyl)benzene, an alkyl hydroperoxide and a dialkyl peroxide.

7. A composition in accordance with claim 6 wherein said first ethylene polymer is characterized by a density of about 0.942 to about 0.956 and a melt index of about 0.1 to about 0.8 and is selected from the group consisting of an ethylene homopolymer and a copolymer of ethylene and a $C_3$–$C_8$ alpha-olefin; said second ethylene polymer is characterized by a melt index of between about 30 and about 500 and is selected from the group consisting of an ethylene homopolymer and a copolymer of ethylene and a $C_3$–$C_8$ alpha-olefin; and said organic peroxide is selected from the group consisting of 2,5-dimethyl-2,5-di(t-butylperoxy)hexyne-3, dicumyl peroxide, dimethyl-2,5-di(t-butyl peroxyisopropyl)benzene, t-butyl hydroperoxide and di-t-butyl peroxide.

8. A composition in accordance with claim 7 wherein said first ethylene polymer is characterized by a density of between about 0.945 and about 0.950 and a melt index of between about 0.15 and about 0.6 and is selected from the group consisting of an ethylene homopolymer and a copolymer of ethylene and a $C_3$–$C_8$ alpha-olefin wherein said $C_3$–$C_8$ alpha-olefin is present in a molar concentration of between about 0.1% and about 4% based on the total concentration of said copolymer; said second ethylene polymer is characterized by a melt index of between about 40 and about 200 and is selected from the group consisting of an ethylene homopolymer and a copolymer of ethylene and a $C_3$–$C_8$ alpha-olefin; and said organic peroxide is selected from the group consisting of 2,5-dimethyl-2,5-di(t-butylperoxy)hexyne-3 and dicumyl peroxide.

* * * * *